INVENTOR
CLARENCE W. VOGT

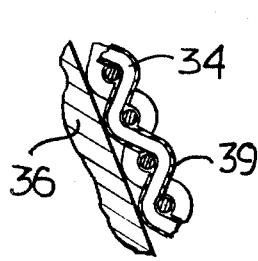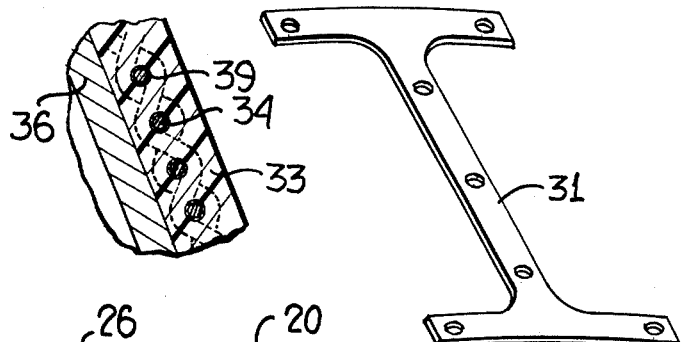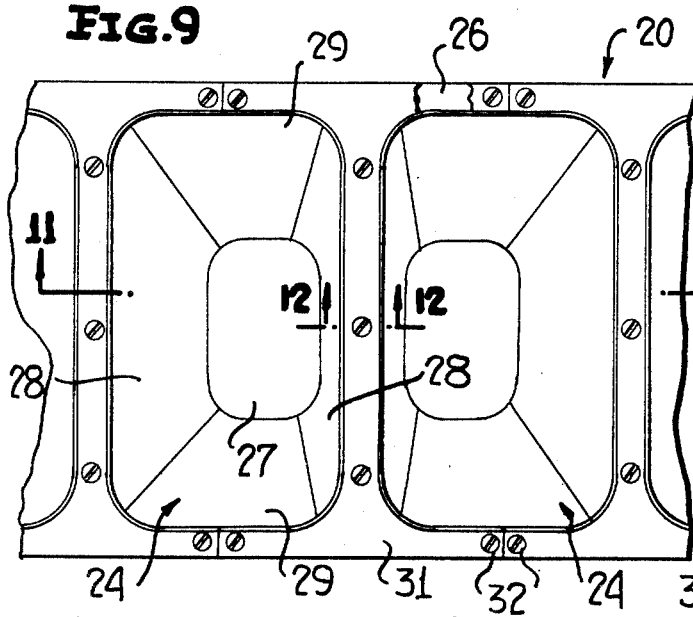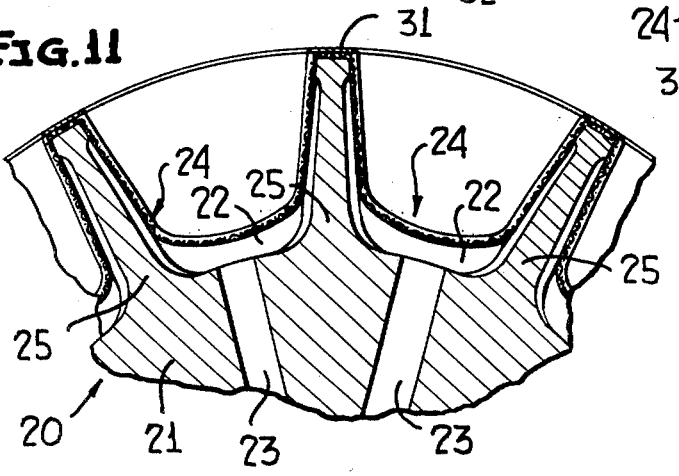
INVENTOR
CLARENCE W. VOGT

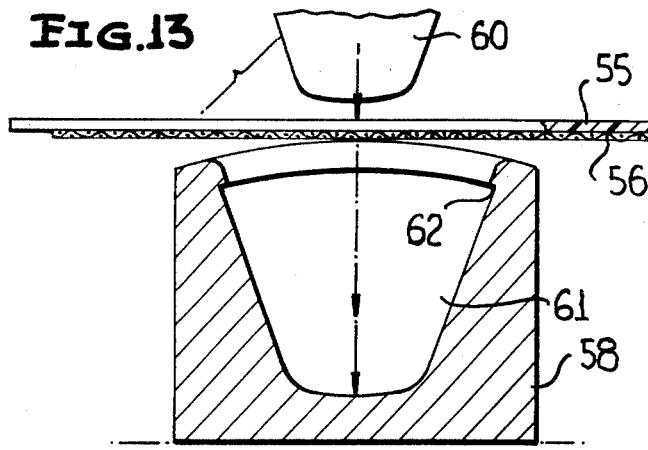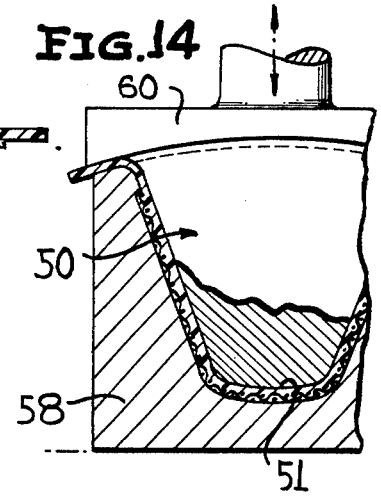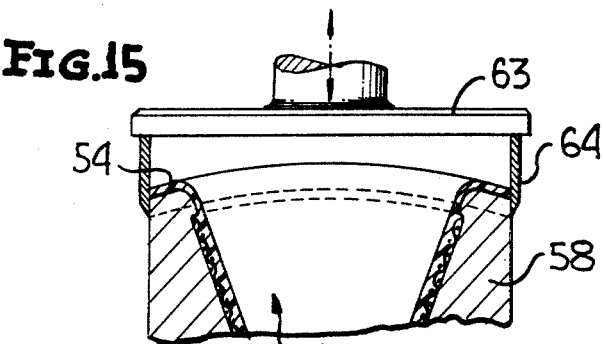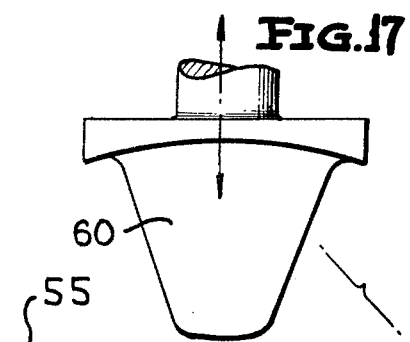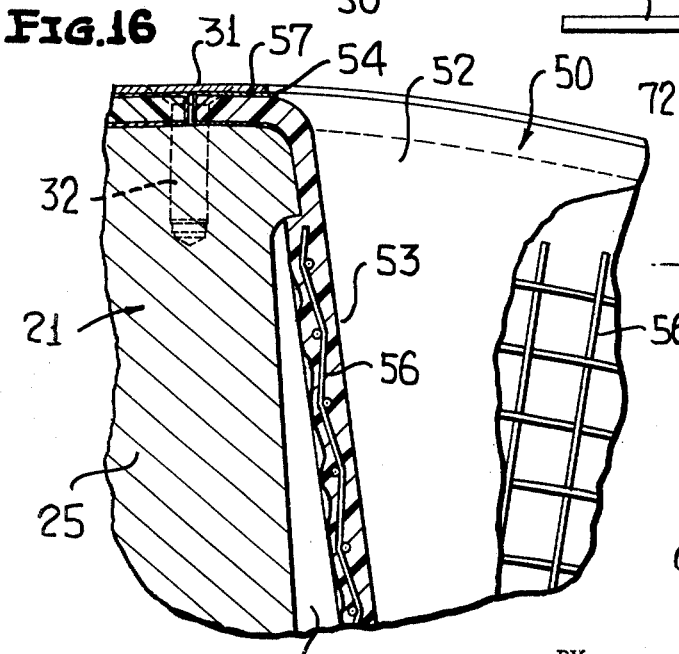

United States Patent Office 3,500,991
Patented Mar. 17, 1970

3,500,991
PRESSURE DIFFERENTIAL MATERIAL
HANDLING DEVICE
Clarence W. Vogt, Box 232, Westport, Conn. 06880
Filed July 13, 1967, Ser. No. 653,261
Int. Cl. B65g 53/60; B01d 39/16
U.S. Cl. 198—211                     11 Claims

ABSTRACT OF THE DISCLOSURE

A material handling apparatus of the pressure differential type having a pocket liner. The liner is formed of a porous material, preferably a material formed of discrete particles of plastic material which are suitably bonded together, such as by sintering. The liner may be formed either by molding a sheet of the porous plastic material or by spraying the discrete particles on a mold. In addition, the liner may be reinforced by a mesh reinforcement which is embedded in the plastic material.

---

This invention relates in general to new and useful improvements in liners for use in handling apparatus of the pressure differential type, and more particularly to a novel replaceable liner which may be easily provided in the desired configuration and which is of a porous construction so as to permit the free passage of gases while restraining finely divided materials.

The liner is preferably formed of discrete particles of plastic material which are suitably bonded together, such as by sintering. The preferred plastic material is linear, high density, polyethylene, preferably of the Ziegler type although other plastics with similar characteristics may be utilized.

A principal feature of this invention is the fact that the liner may be readily formed to the desired configuration and may be accurate as to the volumetric contents. At the same time, inasmuch as the construction of the liner permits for the freedom of flow of gases while restraining finely divided materials, the liner is particularly suited for use in material handling apparatus of the pressure differential type. In addition, inasmuch as the liner is preferably formed of a friction resistant material, relatively sticky materials, such as bread doughs, may be handled equally as well as finely divided powdery materials.

Another feature of this invention is that the liner, although it is formed of a plastic material, may be relatively thin so as to permit a high volume of gas flow therethrough while at the same time it may have sufficient strength due to the provision of a wire reinforcement which may be readily embedded in the plastic material.

In accordance with this invention, the liner may be either plain or reinforced and may either be built up of discrete particles on a mold or shaped from a pre-formed sheet. In addition, the liner may have a peripheral mounting flange which is preferably provided with a suitable coating so as to be imperforate and thereby to restrict the flow of gases through the liner to pocket defining walls thereof.

With the above and other objects in view that will hereinafter appear, the nature of the invention will be more clearly understood by reference to the following detailed description, the appended claims and the several views illustrated in the accompanying drawings.

In the drawings:

FIGURE 7 is an enlargement of the sectional view of FIGURE 5 and shows generally the relationships of the mesh reinforcement and the mold prior to the application of the plastic material.

FIGURE 8 is an enlarged fragmentary sectional view in accordance with FIGURE 6 and shows the section of the completed liner while it remains on the mold.

FIGURE 9 is a plan view of a rotor of a material handling apparatus having a plurality of the liners mounted therein.

FIGURE 10 is a perspective view of a liner retaining strap.

FIGURE 11 is an enlarged fragmentary vertical sectional view taken along the line 11—11 of FIGURE 9 and shows the manner in which the liners are mounted in the rotor.

FIGURE 12 is an enlarged fragmentary vertical sectional view taken along the line 12—12 of FIGURE 9 and shows the specific manner in which the liners are clamped in place.

FIGURE 13 is a schematic vertical sectional view showing an early step in another method of forming the liner.

FIGURE 14 is a schematic vertical sectional view similar to FIGURE 13 and shows the liner of material shaped within the mold.

FIGURE 15 is a fragmentary vertical sectional view showing the trimming of the periphery of the liner.

FIGURE 16 is an enlarged fragmentary sectional view through a rotor assembly and shows the specific construction of the liner and the manner in which it is secured to the rotor.

FIGURE 17 is a schematic elevational view showing the manner in which a liner which is void of reinforcement may be formed.

Figure 1:
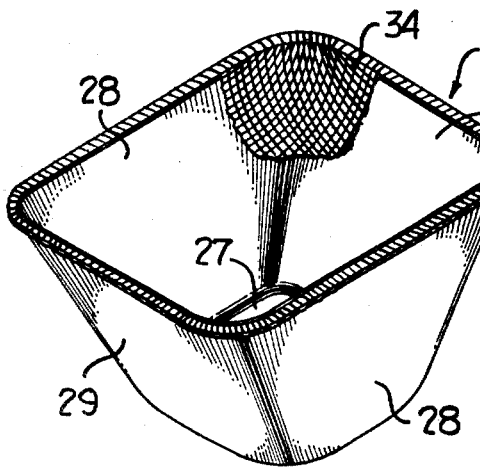
FIGURE 1 is a top perspective view of one form of liner formed in accordance with this invention, the liner being reinforced and portions of the plastic material being broken away to show the details of the mesh reinforcement.
Figure 2:
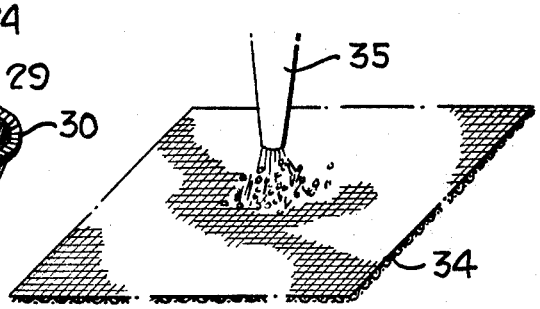
FIGURE 2 is a schematic perspective view showing the first step in preparing the mesh reinforcement.
Figure 4:
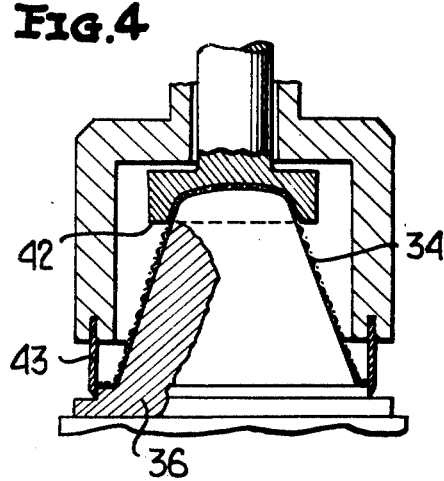
FIGURE 4 is a vertical sectional view showing the trimming of the periphery of the mesh reinforcement.

Referring now to the drawings in detail, it will be seen that there is illustrated in FIGURES 9 and 11 a rotor 20 of a material handling apparatus of the pressure differential type. It is to be understood that the rotor 20 will be mounted within a suitable housing (not shown) for rotation and the housing will have an inlet and an outlet opening into the rotor 20. The rotor 20 preferably is in the form of a rigid frame member 21 having a plurality of cavities 22 formed in the peripheral surfaces thereof, the cavities 22 extending substantially the full length of the frame 21. The frame 21 is also provided with a plurality of radiating passages 23 which open into the bottom portions of the cavities 22. In each cavity 22 there is positioned a liner, generally referred to by the numeral 24, the liner 24 being the subject of this invention. The cavities 22 are defined by axially extending ribs 25 and rims 26 of the frame 21.

Basically, each liner 24 includes a bottom wall 27, a pair of side walls 28 and a pair of end walls 29. The end and side walls slope down towards the bottom 27 whereby releasing of material from within the liner 24 is readily facilitated. The liner 24 is also provided with a peripheral flange 30 which is seated upon the ribs 25 and the rims 26 and clamped in place by means of generally I-shaped strap members 31 which are secured to the frame 21 by means of fasteners 32 which preferably have countersunk heads. It is to be noted that the straps 31 are provided with a coating 33' on the external surface thereof, the coating being preferably of a suitable resilient plastic material which has wear resistant qualities, which is sufficiently soft to form a seal with the housing (not shown) and which has very good anti-friction characteristics. Teflon has proved to be very satisfactory for the coating material 33, although other material will suffice.

At this time it is pointed out that the liner 24 is formed of a porous material, preferably a plastic material through which air and other gases may readily flow but wherein passage of finely divided materials is excluded. It has been found that linear, high density polyethylene, of the Ziegler type, provides highly satisfactory results. At the same time, this plastic material has a very low coefficient of friction and therefore, there is a lack of tendency for even relatively sticky materials, such as bread doughs, to stick to the liner 24. The plastic material, which is identified by the numeral 33, is preferably reinforced by a suitable mesh reinforcement 34.

The general details of one of the liners 24 are best shown in FIGURE 1. The liner 24 is formed by first providing a sheet of mesh reinforcement 34 of a proper dimension, and then cleaning the same in any desired manner, including the use of said blasting equipment 35. After the mesh reinforcement 34 is properly cleaned, it is clamped over a male mold 36 having a base 37 by means of a female mold 38 under pressure. The female mold 38 may be carried by a piston rod 40 or similar support. The base 37 of the male mold may be seated on a platen 41 or other support of a pressed structure.

After the mesh reinforcement 34 has been shaped about the mold 36, the female mold 38 is removed and thereafter the portion of the mesh reinforcement 34 which will become the bottom of the liner 24, is clamped to the mold 36 by a suitable hold down 42 while a trimmer 43 trims the edges of the mesh reinforcement 34 in combination with the base 37 so that the mesh reinforcement 34 will have the desired peripheral outline.

Figure 5:
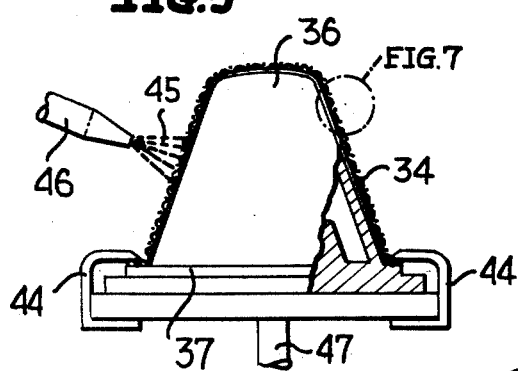
FIGURE 5 is a vertical sectional view showing the application of the plastic material in the form of discrete particles by spraying.
Figure 6:
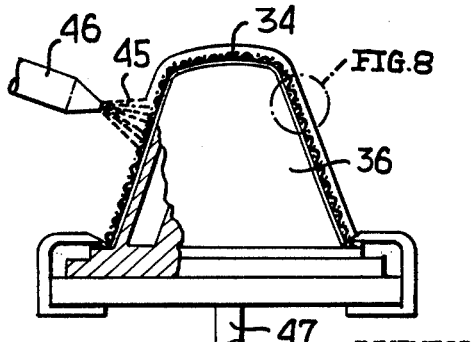
FIGURE 6 is a view similar to FIGURE 5 showing how the plastic material has built up on the mold and around the mesh reinforcement.

Thereafter, the shaped mesh reinforcement is clamped against the base 37 by means of suitable clamps 44, as is shown in FIGURE 5. Then discrete particles 45 of a suitable plastic material, as outlined above, may be sprayed onto the male mold 36 through the mesh reinforcement 34 by means of a spray nozzle 46. The discrete particles of plastic material may be suitably heated and the mold 36 may be internally heated by means of any suitable heat supply, such as the heat pipe 47. The discrete particles 45 of plastic material, as they strike the surface of the mold 36, are sufficiently heated so that when a next particle strikes a previous particle, there is a bonding together, such as by sintering. As the discrete particles build up on the mold 36, the mesh reinforcement 34 becomes encased. It is to be understood that by carefully spraying the discrete particles onto the mold 36, a uniform thickness of plastic material 33 may be obtained. Also, it is to be noted that the plastic material has a tendency to force the mesh reinforcement 34 away from the surface of the mold 36 so that the plastic material 33 completely surrounds the mesh reinforcement 34, as is shown in FIGURE 8.

At this time it is pointed out that the polyethylene may be sprayed at a temperature ranging from 230 degrees F. to 350 degrees F. It has been found that this temperature range is suitable to obtain the necessary surface-to-surface binding of the discrete particles of plastic material. It has also been found that sticking of the heated plastic particles to the mold 36 will be prevented if it is provided with a polished finish, such as a polished chromium plated finish.

Alternatively, the spray nozzle 46 may be of the electrostatic type with the plastic particles being retained in place by electrostatic attraction and coated screen being transferred to an oven for curing.

It has also been found that a liner very similar to the liner 24 may be formed by a slightly different process. This liner is generally referred to by the numeral 50. The liner 50, like the liner 24, will include a bottom wall 51, side walls 52 and end walls 53. In addition, the liner 50 is provided with a peripheral mounting flange 54.

The liner 50 differs from the liner 24 in that in lieu of being formed by spraying discrete particles of plastic material onto a mold over a mesh reinforcement with the discrete particles being bonded together, such as by sintering, the liner 50 is formed from a sheet 55 together with a preshaped section of mesh reinforcement 56. The sheet 55 is previously formed of discrete particles of plastic material which are suitably bonded together, such as by sintering, but is readily purchased in sheet form. It is to be understood that the sheet 55 may be formed of particles of linear, high density polyethylene, or other plastics having similar characteristics.

The liner 50 is formed in a mold 58 by means of a plunger 60. The mold 58 has a cavity 61 which includes a step 62.

It is to be understood that the mesh reinforcement 56 is cut to a predetermined outline substantially as required by the cavity of the mold 61 within the step. The mesh reinforcement 56, with the sheet 55 overlying the same, is placed on the mold 58 in the manner illustratd in FIGURE 13 and thereafter the plunger 60 is moved downwardly in the manner shown in FIGURE 14 to simultaneously shape both the mesh reinforcement 56 and the sheet material 55. After the liner 50 is shaped within the mold 58, the plunger 60 is withdrawn and a trimming device 63 having a peripheral trimming blade 64 is moved into engagement with the formed liner 50 and in cooperation with the mold 58 trims the peripheral mounting flange 54 thereof to an accurate size.

Referring now to FIGURE 16 in particular, it will be seen that the liner 50 is illustrated as installed within the rigid frame member 21. It is to be noted that during the shaping of the sheet material 55, it is forced partially through the reinforcing mesh 56 with the result that the reinforcing mesh is embedded therein. Thus, there is the desired interlock between the reinforcing mesh and the plastic material of the liner 50.

It is also to be noted that the peripheral flange 54 of the liner 50 is provided with a sealant 57. The sealant 57 may either be a suitable material applied to the peripheral flange 54, or in the case of certain plastic materials, may be in the form of a solid skin which may be formed by heating and melting the surface particles of the peripheral flange so that they form a continuous skin.

Reference is now made to FIGURE 17 wherein there is illustrated a slightly different mold 70. The mold 70 differs from the mold 58 only in that it has a cavity 71 which is devoid of the step of the mold cavity 61. The mold 70 is intended for the molding of a liner, such as the liner 50, but without the mesh reinforcement. The mold 70 is utilized in cooperation with the plunger 60 for molding only a single sheet 55 of plastic material. The resultant liner, which is illustrated in dotted lines in FIGURE 17 and which is identified by the numeral 72 will have the same configuration as the liner 50, but without the stepped configuration thereof, as provided by the molds 58.

Figure 3:
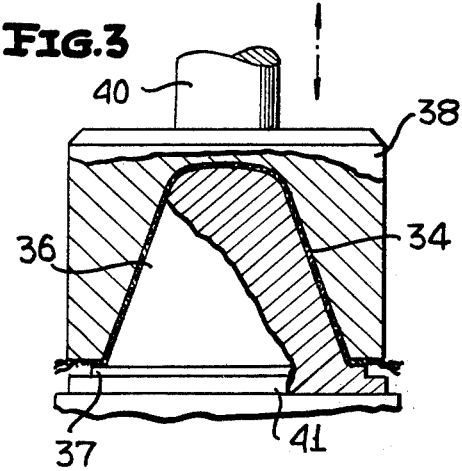
FIGURE 3 is a schematic vertical sectional view showing the shaping of the mesh reinforcement.

At this time it is also pointed out that a liner identical to the liner 24, but devoid of the mesh reinforcement 34 may be formed utilizing the mold 36. It is merely necessary to spray the discrete particles of plastic material directly onto the mold 36 without applying the mesh reinforcement. On the other hand, when the mesh reinforcement 34 is utilized, it may be desirable to coat the mesh reinforcement 34 after it has been formed about the mold in the manner shown in FIGURE 3 with a thin layer 39 of suitable silicone which will serve to bond together the individual strands of the mesh reinforcement at the intersections thereof. The coating material 39, of necessity, should be a material which can be applied and cured at a relatively low temperature and which is compatible both with the metal of the mesh reinforcement 34 and the plastic material 33 applied thereover.

It is to be understood further that the plastic material 33 may extend around the mesh reinforcement into the peripheral flange 30 of the liner 24. Another permissible modification is that the mesh reinforcement 34 may terminate short of the peripheral flange 30 and the peripheral flange be formed solely of the plastic material 33.

It is understood that the thickness of the plastic material and the various liners may vary. However, it is believed that for all ranges of liners of the type to which this invention relates, the thickness of the plastic material of the finished liner should be in the range of $1/16$ inch to $3/16$ inch. It is to be understood, of course, that the unreinforced plastic material should be thicker than that which is reinforced by the mesh reinforcement. The individual wires of the mesh reinforcement should have a diameter of approximately $1/32$ inch and the mesh opening should range generally between $1/8$ inch and $1/4$ inch.

It is to be understood that in each of the liners, the plastic material will have sufficient porosity so as to permit the free passage of gases while preventing the passage of finely divided solids. It is also to be understood that the plastic material from which the liners are to be made should be one having high release quality whereby there is little or no tendency of material being handled by the liners to stick to the walls thereof.

I claim:

1. A pressure differential type material handling device comprising a basket shaped liner, said liner being rigid and formed of bonded together minute particles of plastic material with there being minute gas passages between said particles and said liner having walls which provide for free passage of gaseous media therethrough while retaining therein solids including finely divided solids.

2. The liner of claim 1 wherein said liner is reinforced by a mesh embedded within the confines of said bonded together particles of plastic material, said mesh having a diameter of approximately $1/32$ inch and a mesh opening ranging from $1/8$ inch to $1/4$ inch.

3. The liner of claim 1 wherein said liner has the appearance of being shaped from sheet material.

4. The liner of claim 1 wherein said liner has the appearance of being formed by bonding said particles in situ.

5. The liner of claim 1 wherein said liner has a continuous peripheral attaching flange, and said attaching flange being impervious to the passage of gases therethrough.

6. The liner of claim 1 wherein said liner is reinforced by a mesh embedded within the confines of said bonded together particles of plastic material.

7. The liner of claim 1 wherein said liner is reinforced by a mesh embedded within the confines of said bonded together particles of plastic material, said liner has a continuous peripheral attaching flange, and said mesh terminating short of said flange.

8. The liner of claim 1 wherein said plastic material is formed of linear, high density polyethylene, and said bond is a sintered bond.

9. The liner of claim 1 wherein said liner is reinforced by a mesh embedded within the confines of said bonded together particles of plastic material, said mesh reinforcement being formed of metal strands having a silicone coating thereon with said silicone coating bonding together individual strands of said mesh, said silicone coating being compatible with both the metal of said mesh reinforcement and the plastic material of said minute particles.

10. A material handling device of the pressure differential type comprising a rotor having a plurality of circumferentially arranged cavities defined by axially extending rims and ribs, and a liner seated in each cavity, each liner being of a basket shape and formed of bonded together minute particles of plastic material with there being minute gas passages between said particles and said liner having walls which provide for free passage of gaseous media therethrough while retaining therein solids including finely divided solids, said liner having a continuous peripheral attaching flange, and means carried by said rims and ribs releaseably securing said attaching flange to said rims and ribs.

11. The material handling device of claim 10 wherein each rib has a shoulder projecting into each respective cavity thereof adjacent the periphery of said rotor, and an associated portion of each liner is reduced in thickness to define a shoulder locked behind the shoulder of the associated rib.

References Cited

UNITED STATES PATENTS

| 1,334,024 | 3/1920 | Embrey | 107—4 |
|---|---|---|---|
| 1,781,254 | 11/1930 | Stelzner | 55—511 |
| 1,878,988 | 9/1932 | Akins | 210—402 X |
| 2,196,074 | 4/1940 | King | 55—523 X |
| 2,604,958 | 7/1952 | Leufvenius | 184—105 |
| 2,745,513 | 5/1956 | Massey | 55—523 X |
| 2,795,290 | 6/1957 | Butsch et al. | |
| 2,826,265 | 3/1958 | DeWoody | 55—522 X |
| 2,957,235 | 10/1960 | Steinberg | 29—424 |
| 2,999,562 | 9/1961 | Lechtenberg | 55—502 |
| 3,017,167 | 1/1962 | Griffen | 261—34 |
| 3,056,361 | 10/1962 | Law | 220—60 X |
| 3,140,995 | 7/1964 | Kinney | 210—393 |
| 3,148,101 | 9/1964 | Allman et al. | 156—167 |
| 3,157,481 | 11/1964 | Bujan | 55—417 |
| 3,235,060 | 2/1966 | Gamberini | 198—25 X |
| 2,860,761 | 11/1958 | Kocan et al. | |
| 2,927,707 | 3/1960 | Reed et al. | |
| 3,058,588 | 10/1962 | Palmquist. | |
| 3,094,128 | 6/1963 | Dearsley | 198—211 X |
| 3,139,972 | 7/1964 | Kochalski | 198—211 |

FOREIGN PATENTS

| 548,737 | 4/1932 | Germany. |
|---|---|---|
| 750,177 | 6/1956 | Great Britain. |

HARRY B. THORNTON, Primary Examiner

DENNIS E. TALBERT, Jr., Assistant Examiner

U.S. Cl. X.R.

55—400, 511, 523, 524, 529; 117—21, 99; 210—330, 404, 406, 496, 499; 214—1; 264—41, 109